April 13, 1965            P. H. SPITZ            3,177,632
PROCESS FOR THE THERMAL CHLORINATION OF ALIPHATIC HYDROCARBONS
Filed April 14, 1961
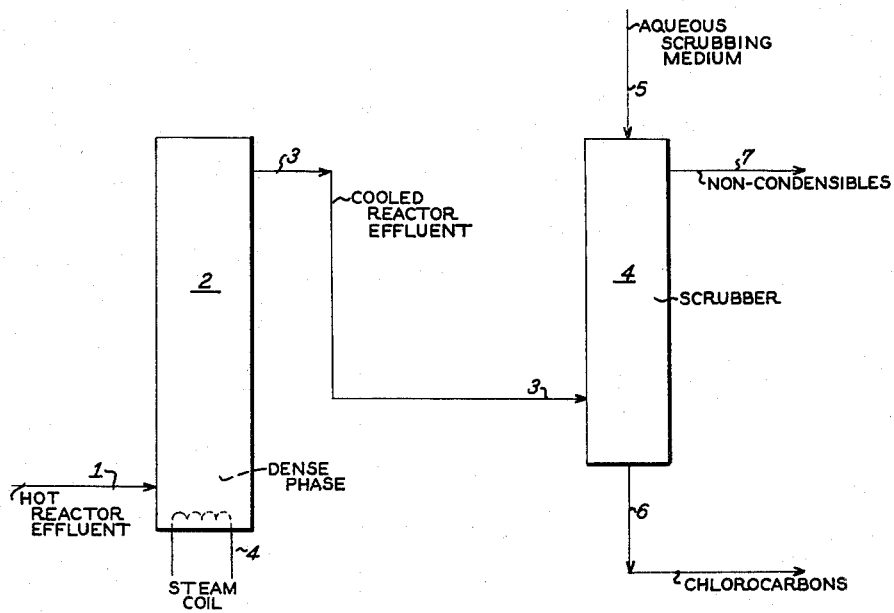
Bert J. Lewen
ATTORNEY

3,177,632
PROCESS FOR THE THERMAL CHLORINATION OF ALIPHATIC HYDROCARBONS
Peter H. Spitz, Hartsdale, N.Y., assignor to Halcon International, Inc., a corporation of Delaware
Filed Apr. 14, 1961, Ser. No. 102,940
3 Claims. (Cl. 55—71)

This invention relates to exothermic chemical processes, wherein byproduct heat is recovered, more particularly to such processes having a metastable equilibrium mixture of materials and requiring extremely rapid temperature change in order to avoid upsetting the equilibrium, and especially to the recovery of heat from the thermal chlorination of aliphatic hydrocarbons at higher temperatures approximating 500° to 600° C. wherein the reactor effluent is abruptly quenched.

Exothermic reaction processes are known and in some cases the byproduct heat may be recovered in conventional indirect heat exchangers. However, such heat exchangers cannot be used where rapid quenching is required, especially where there may be a deposit or coating formed on an indirect heat-exchanging surface. The art is confronted by the problem of providing means or methods for efficiently recovering heat from highly sensitive exothermic reaction systems, such as the manufacture of perchloroethylene and/or carbon tetrachloride by thermal chlorination of aliphatic materials, with rapid quenching to avoid upsetting the reaction mixture equilibrium.

The discoveries associated with the invention and relating to the solution of the above problems, and the objects achieved in accordance with the invention as set forth herein include the provision of:

a process for rapidly recovering heat from a vapor stream which is at elevated temperature which process comprises directly exchanging the heat of said vapor with a fluidized mass of inert solid particles;

such a process wherein the superficial vapor velocity is in the range of 0.5 to 10 ft./sec., a part of the solid particles form a dense phase, and this phase is an indirect heat-exchange contact with water in a steam generating coil;

such a process wherein the vapor stream contains chlorine and perchloroethylene and it is quenched from a temperature of 500° to 600° C. down to about 125° to 300° C. without substantially altering the product distribution in the vapor stream;

such a process wherein the solid particles are glass microspheres;

such a process wherein the quenched vapor stream is processed to recover chlorine by treatment involving contacting with an aqueous hydrochloric acid solution;

and other objects which will be apparent as details or embodiments of the invention are set forth hereinafter.

The attached figure illustrates the process of the instant invention. A reactor effluent from the thermal chlorination reactor is passed via line 1 to a vertical cylindrical vessel 2 which contains a fluidized bed of glass microspheres. The hot reactor effluent, at a temperature of about 500 to 600° C., is passed into contact with the dense phase fluidized material. This results in the cooling of the reactor effluent to a temperature of about 200° C. and the condensation of the hexachlorobenzene. The cooled reactor effluent is withdrawn via line 3. The dense phase of the fluidized bed in vessel 2 is cooled by contact with coil 4. Deaerated boiler feed water is fed to these coils to produce steam. The cooled reactor effluent is passed to contacting vessel 4 where it is contacted with an aqueous scrubbing medium introduced via line 5 and cooled down to a temperature of about 25 to 50° C. This serves to condense the carbon tetrachloride and perchloroethylene which is removed via line 6 and subjected to a further purification process. Uncondensed vapors are removed via line 7.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

*Example 1*

A vapor stream obtained in the manufacture of perchlorethylene by thermal chlorination is processed as set forth in U.S. Patent 2,909,240 to recover the chlorine. However before contacting with the acidic scrubbing medium to bring the temperature down to about 25° to 50° C., the vapor stream is quenched from a temperature of 500° to 600° C. down to about 200° C. This quenching is by means of a fluidized bed of solid material such as glass microspheres contained in an insulated vessel, e.g., of vertical cylindrical shape, and the dense phase of the fluidized or boiling bed is in contact with steam coils or equivalent indirect heat-exchange means. Deaerated boiler feed water is fed into the coils and steam is produced. Other fluids may be used instead, as known in the art.

The proportion of fluidized solid to the gas treated is sufficiently high to absorb substantially all the heat involved in bringing the reactor effluent from the temperature of about 400° to 650° C. or above down to the temperature of 150° to 250° C. The vapor stream is rapidly quenched to a low enough temperature to avoid altering the product distribution therein, and heat is recovered.

In this process, the hexachlorobenzene in the vapor is at its solidification point so that upon reduction of the temperature this material would tend to deposit or coat any stationary surface wih which it comes in contact. However, the motion of the fluidized solid particles tends to break up any solid deposit of this material, and it is attrited and leaves the fluidized bed in the exit gases. In addition, the surfaces of the cooling coils are continuously scoured or cleaned by the action of the fluidized particles so that heat-transfer thereto from the solid particles is not impaired and can be maintained at the desired level.

An effluent mixture from the chlorination reactor, comprising 10,000 lbs. per hour of a mixture of $C_2Cl_4$, $CCl_4$, $Cl_2$ and HCl at 550° C. is introduced into a vessel containing 2200 lbs. of glass microspheres in a fluidized bed. This material is held at a temperature of 150° C. by means of steam coils submerged in the dense phase. The pressure in this vessel is set at 17.5 lbs. per sq. inch abs. is obtained due to back pressure from down stream equipment.

The gas entering the vessel contains the above mentioned compounds in the ratio of 1.5 mols of $C_2Cl_4$, 3 mols of $CCl_4$, 2 mols of chlorine, 2 mols of $Cl_2$ and 2 mols of HCl as well as minor impurities as $C_2Cl_6$, $C_4Cl_6$ and $C_6Cl_6$. The molecular weight of the entering mixture is approximately 79. Under these conditions a fluid bed vessel having a diameter of 3 ft. and containing a dense bed height of 8 ft. is employed for the quench. This bed operates at a vapor velocity of approximately 2.5 ft. per second and at a dense bed density of approximately 45 lbs. per cubic foot. The glass microspheres have a particle size distribution ranging from 30 to 300 microns (diameter).

Comparable results to the foregoing are achieved with various modifications thereof including the following.

The initial vapor stream may be any reactor effluent which must be rapidly quenched. The cooling or quenching by means of the fluidized solid is limited by the dew point of the materials in the system; i.e., it is necessary to stay above dew point of these materials in order to maintain proper fluidized action. However, small proportions of materials which solidify under the operating conditions do not interfere with the fluidizing action. The vapor may be cooled down to a temperature in the range of 125° to 300° C.

The temperature to which the vapor stream lowered is related to the type of byproduct steam desired. If high pressure steam is to be produced, the quenching is not to as low a temperature as it would be if lower pressure steam is desired. Obviously, the load on the subsequent acidic scrubbing step will be higher if the temperature of the steam leaving the fluidized bed heat-exchanger is higher than where the temperature of the latter is lower.

The fluidized material is arranged and contained in conventional equipment and the depth, particle size, and particle density are selected to achieve the desired contact with the vapor passing up therethrough without causing undue pressure drop in the system.

The vessel is sized to operate at a gas velocity at flowing conditions of about 2 to 3 ft. per second. A velocity of 0.5 to 10 ft. ft. per second is permissible, but at the higher velocity, cyclone or other knockback devices are required. The velocity partly depends on the operating density of the fluid bed. The dense phase density ranges between 30 and 60 lbs. per cubic foot depending on the skeletal or particle density of the fluidized material used. This may be a material such as sand, glass beads, or other materials that are inert in the prevailing conditions.

The results achieved in accordance with the invention are indeed surprising, especially in view of the marked manufacturing economies as well as the reduction in capital requirements achieved thereby.

In view of the foregoing disclosures, variations and modifications thereof will be apparent to one skilled in the art, and it is intended to include within the invention all such variations and modifications except as do not come within the scope of the appended claims.

What is claimed is:

1. A process for the quenching of a reactor effluent from the thermal chlorination of aliphatic hydrocarbons, said reactor effluent being at a temperature of from 400 to 650° C. and containing $C_2Cl_4$, $CCl_4$ and trace amounts of hexachlorobenzene, which comprises: passing said hot reactor effluent into a vessel at a gas velocity of from 0.5 to 10 ft. per second; maintaining a fluidized bed of solid particles in said vessel having a dense phase with a density of from 30 to 60 lbs./ft.$^3$, contacting said reactor effluent with said fluidized bed to quench said reactor effluent to a temperature of 125 to 300° C. and condensing said hexachlorobenzene; maintaining said fluidized bed at a temperature of from 125 to 300° C. by indirect heat exchange in said dense phase; withdrawing said reactor effluent from said vessel; and further cooling said reactor effluent to condense said $C_2Cl_4$ and $CCl_4$.

2. The process of claim 1 wherein steam is formed in said indirect heat exchanger.

3. The process of claim 1 wherein the solid particles are glass spheres.

References Cited by the Examiner
UNITED STATES PATENTS

| | | | |
|---|---|---|---|
| 2,442,324 | 5/48 | Heitz et al. | 260—654 |
| 2,447,834 | 8/48 | Balcar | 55—71 |
| 2,541,693 | 2/51 | Frevel et al. | 260—683 |
| 2,550,722 | 5/51 | Rollman | 62—57 |
| 2,657,473 | 11/53 | Montgomery et al. | 34—10 |
| 2,690,057 | 9/54 | Eastwood | 62—63 |
| 2,730,194 | 1/56 | Wohlers et al. | 55—71 |
| 2,746,998 | 5/56 | Brown et al. | 260—654 |
| 2,919,296 | 12/59 | Thermet et al. | 260—654 |
| 2,953,524 | 9/60 | Rich | 208—750 |
| 2,957,033 | 10/60 | Degeorges et al. | 260—654 |

HARRY B. THORNTON, *Primary Examiner.*

HERBERT L. MARTIN, *Examiner.*